United States Patent [19]
Rybicki

[11] Patent Number: 5,483,182
[45] Date of Patent: Jan. 9, 1996

[54] METHOD AND APPARATUS FOR A DC-DC CONVERTER AN CURRENT LIMITING THEREOF

[75] Inventor: Mathew A. Rybicki, Austin, Tex.

[73] Assignee: Motorola, Inc., Schaumburg, Ill.

[21] Appl. No.: 399,003

[22] Filed: Mar. 6, 1995

[51] Int. Cl.⁶ .................................................. H03K 5/22
[52] U.S. Cl. ............................ 327/5; 327/333; 327/67; 327/72; 363/59; 363/62
[58] Field of Search .................... 327/72, 67, 333, 327/5; 363/59, 62

[56] References Cited

U.S. PATENT DOCUMENTS 5,343,034  8/1994  Sato ........................................ 327/333

OTHER PUBLICATIONS

D. Vargha; "Squeeze More Working Hours From Battery–Powered PCs;" Electronic Design—PC Design Special Editorial Feature; (Oct. 15, 1992).

Primary Examiner—Margaret Rose Wambach
Attorney, Agent, or Firm—Keith E. Witek; Timothy W. Markison

[57] ABSTRACT

A reference current source (38) and a matched reference transistor (40) are provided as part of a current limiting circuit, wherein the matched reference transistor (40) is scaled, electrically matched, and physically located in close proximity to an on-chip switching transistor (16) of a DC—DC converter. By serially coupling the reference current source (38) to the reference transistor (40), a reference signal (48), which is equal to the voltage across the reference transistor (40), is generated. The reference signal (48) is compared to the voltage across the switching transistor (16) while the switching transistor (16) is conducting. When the voltage across the switching transistor (16) exceeds that across reference transistor (40), the gate drive to the switching transistor (16) is disabled for the remainder of the current conductive phase.

12 Claims, 3 Drawing Sheets

METHOD AND APPARATUS FOR A DC-DC CONVERTER AN CURRENT LIMITING THEREOF

FIELD OF THE INVENTION

This invention relates generally to DC—DC converters and more particularly to current limiting techniques for such DC—DC converters.

BACKGROUND OF THE INVENTION

DC—DC converters are known to convert one DC (Direct Current) voltage to another DC voltage. For example, a particular DC—DC converter, in a commercial setting, may convert a 12 volt supply to a 5 volt supply or a 3 volt supply to a 5 volt supply.

The basic topology of a DC—DC converter may be of a variety of forms. For example, the topology of a DC—DC converter may be a full-bridge inverter, a half-bridge inverter, a buck converter, a boost converter, or a flyback converter. For low-power application, i.e. below 50 watts, the buck, boost, or flyback topologies are used, while for high-power applications, i.e. above 50 watts, the half-bridge or full-bridge inverters are used.

In integrated circuit (IC) technologies, the power requirements are relatively low, i.e. less than 1 watt. As such, a buck or boost topology is generally used for IC applications. A boost topology is used when the desired output DC voltage needs to be greater than the input voltage, while a buck converter is used when the output voltage needs to be less than the input voltage. Generally, a buck converter includes an inductor, a switching transistor, a diode, and a capacitor. When the switching transistor is conducting, energy is being stored in the inductor. When the switching transistor is turned off, the energy is transferred from the inductor through the diode to the capacitor. The output voltage (the voltage across the capacitor) is monitored by a feedback circuit which regulates the pulse-width of a control signal that gates the switching transistor. In this manner, the output voltage can be tightly regulated, typically within one percent of the desired output value.

As the consumer market drives technology to create portable devices that have extended battery life, many applications are utilizing low voltage. Thus, many ICs are being designed to operate off of low supply voltages, i.e. 2.7–3.3 volts. While most of the components within these ICs can operate at low voltages, there are a few components that require higher voltages to achieve proper performance. For these ICs, a boost DC—DC converter is required. In these applications, the switching transistor, the control circuit, and the diode of the boost converter may be on-chip, while the inductor and capacitor are off-chip.

As is known, many DC—DC converters include current-limiting circuits. One such current limiting circuit incorporates a resistor in series with the switching transistor to establish a current-referenced voltage. This voltage is compared with a reference voltage such that when it exceeds this reference voltage, the DC—DC converter is exceeding a predetermined maximum current. Another type of current-limiting circuit incorporates a current sensing transformer which senses the current through the switching transistor and provides a voltage representation thereof which is compared as previously mentioned. While these circuits adequately monitor current in the circuit, the addition of a current sensing resistor reduces the overall efficiency of the DC—DC converter due to power losses, and the current sense transformer adds both complexity and cost to the circuit. Note that for IC applications, the current-sense transformer would have to be off-chip, thus requiring additional external components for users of the IC.

Therefore, a need exists for a current limiting circuit that can be incorporated within an IC without the power losses of the above mentioned prior-art techniques and without the need for additional external components.

DETAILED DESCRIPTION OF THE DRAWINGS

Generally, the present invention provides a method and apparatus for a DC—DC converter current-limiting circuit. This is accomplished by providing a reference current source and a matched reference transistor. The matched reference transistor is electrically matched and physically located in close proximity to the on-chip switching transistor. In addition, the reference transistor is scaled such that its power requirements are extremely low. By serially coupling the reference current source to the reference transistor, a reference signal, which is equal to the voltage across the reference transistor, is generated. The reference signal is compared to the voltage across the switching transistor while the switching transistor is conducting. When the voltage across the switching transistor exceeds that across the reference transistor, the gate drive to the switching transistor is disabled for the remainder of the current conductive phase. With such a method and apparatus, current limiting is achieved utilizing on-chip components such that less power is consumed than with prior art techniques.

Figure 1:
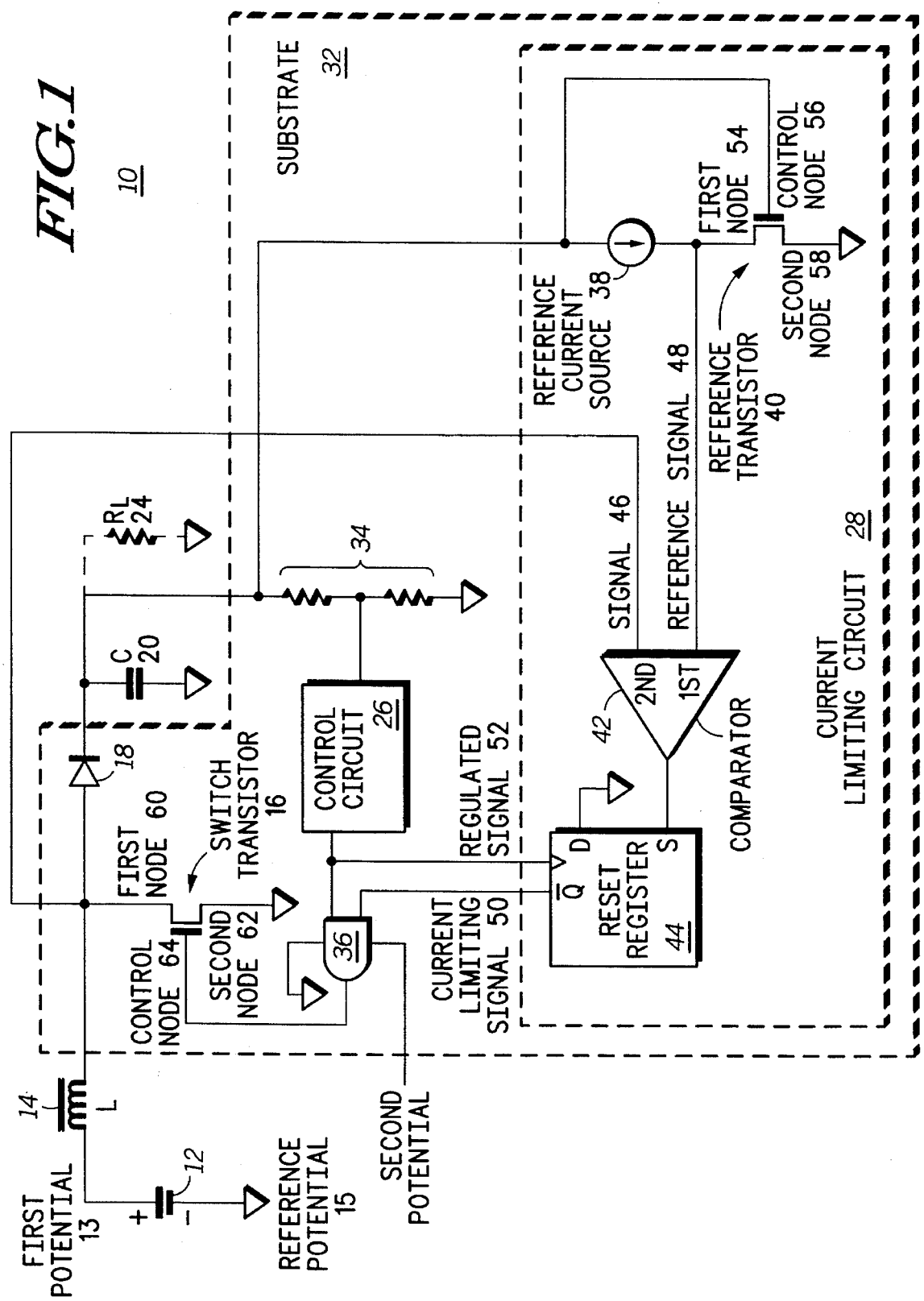
FIG. 1 illustrates, in a schematic diagram, a boost DC—DC converter in accordance with the present invention.

FIG. 1 illustrates a schematic diagram of a boost DC—DC converter 10. The DC—DC converter 10 includes a power source 12, an inductor 14, a switching transistor or current controlling transistor 16, a diode 18, a capacitor 20, a control circuit 26, and a current-limiting circuit 28. Also illustrated in FIG. 1 is a load 24, wherein the load 24 is typically the internal circuitry of the IC supporting the DC—DC converter. The inductor 14, switching transistor 16, diode 18, and capacitor 20 are interoperably coupled to perform a boost DC—DC conversion. The power source 12, which may be an off-chip battery, provides a first potential 13 with reference to a reference potential 15. In many IC applications, the power source 12 will have a potential (first potential 13) of 2.7–3.3 volts, wherein the output potential, or second potential 22, will be 5 volts. The size of the inductor 14 and the switching rate of the switching transistor 16 are determined based on the power requirements needed. For example, for a 500 mW supply, the inductor 14 is 3 µH at a switching frequency of 1 MHz.

The control circuit 26 regulates the output of the DC—DC converter 10, which is represented by the second potential 22. The output voltage, or second potential 22, is sampled by a sensing circuit 34 which typically comprises a pair of serially-coupled sensing resistors 34. The intercoupling node of the series-coupled sensing resistors 34 provides an input signal to the control circuit 26 that is used to generate the regulated signal 52. The control circuit 26 is a pulse-width modulated circuit, which in the example given, operates at the 1 MHz rate. In essence, the control circuit 26 produces a square-wave signal having a variable duty cycle such that by varying the duty cycle, the second potential 22 remains at the desired level. The pulse-width modulated signal, or regulated signal 52, generated by the control circuit 26 is provided to the control node 64 of the switching transistor 16. In this manner, the control circuit 26 provides the pulse-width modulated feedback.

The current-limiting circuit 28 includes a reference current source 38, a reference transistor 40, a comparator 42, and a reset register 44. In operation, the comparator 42 receives, via a second input, a signal 46 which is the voltage imposed across the switching transistor 16. Note that the voltage imposed across the switching transistor 16 is present at the first node 60. The signal 46 is compared with a reference signal 48 that is generated by the reference current source 38 and the reference transistor 40.

When the signal 46 compares unfavorably with the reference signal 48, the comparator 42 will produce a logic high signal. This logic high signal sets the output of the reset register 44. When the set input of the reset register 44 is logic high, the Q-bar output asserts the current limiting signal 50 (logic low). The current limiting signal 50 is gated via AND-gate 36 with the regulated signal 52 such that when the current limiting signal 50 is low, the signal provided to the control node 64 of the switching transistor 16 is low. Thus, in a current-limiting situation, the signal provided to the switching transistor 16 is truncated via the current limiting signal 50 on a pulse by pulse basis. The reset register 44 is reset via the pulse-width modulated signal from the control circuit 26.

The reference transistor 40 includes a first node 54, which is coupled to the reference current source 38, and a second node 58, which is coupled to the reference potential 15. The second node 62 of the switching transistor 16 is also connected to the reference potential 15. Note that the control node 56 of the reference transistor 40 is coupled to the output voltage, or second potential 22. By having the control node 56 coupled to the second potential 22, when the signal 52 provided to the control node 64 is logic high, the potentials at nodes 56 and 64 will be substantially similar.

The reference transistor 40 is selected to be a scaled and matched version of the switching transistor 16. For example, if the scaling factor is 1/100, and the switching transistor 16 is 5000 microns wide by 0.75 microns long, the reference transistor 40 is 50 microns wide by 0.75 microns long. In essence, by scaling and matching the reference transistor 40 to the switching transistor 16, the reference transistor 40 will draw a proportional current and generate a similar voltage to that across the switching transistor 16. Continuing with the example, if the switching transistor 16 is drawing a current of 100 mA, the reference transistor 40 will be drawing 1 mA and will have one hundred times the impedance of the switching transistor 16. For example, if the switching transistor 16 has an impedance of 1 ohm, the reference transistor 40 will have an impedance of 100 ohms. From this example, the reference transistor will be dissipating 100 μW. In comparison, the series current-sensing resistor used in prior-art techniques, which was a 0.5 ohm resistor, dissipated 5 mW for similar current sensing capabilities.

FIG. 1 also illustrates a substrate 32 which encircles the current limiting circuit 28, the control circuit 26, the switching transistor 16, and the diode 18. As shown, these elements are deposited on an IC substrate 32 to provide on-chip current-limiting capabilities for a DC—DC converter. Note that the diode 18 may be achieved using an off-chip diode, or p-channel and n-channel regulated transistors.

Figure 2:
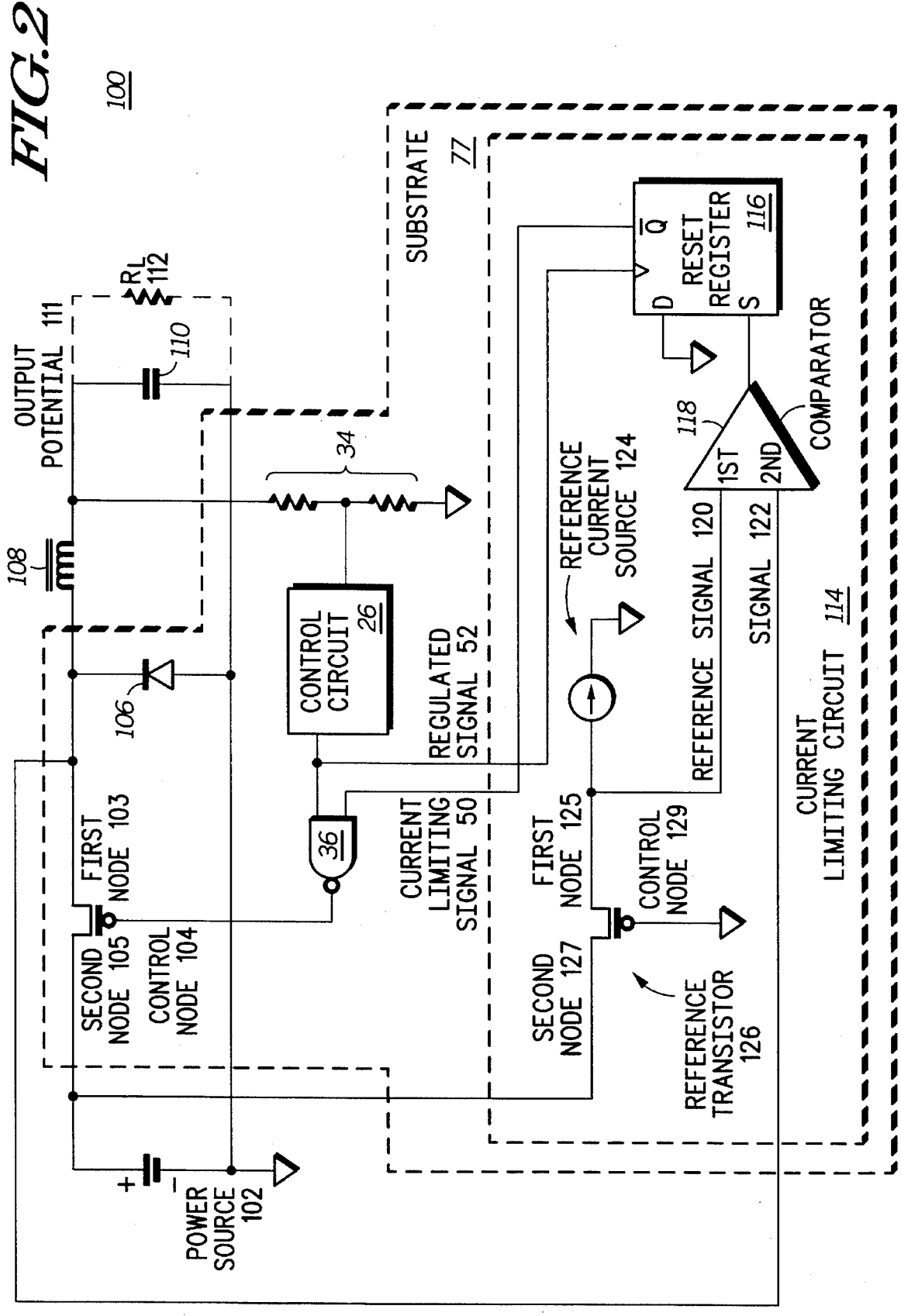
FIG. 2 illustrates, in a schematic diagram, a buck DC—DC converter in accordance with the present invention.

FIG. 2 illustrates a buck converter 100 that steps down a DC input to produce a lower DC output. The DC—DC converter 100 includes a power source 102, an inductor 108, a switching transistor 104, a diode 106, a capacitor 110, a control circuit 26, and a current-limiting circuit 114. Also illustrated is a load 112, wherein the load 112 is typically the internal circuitry of the IC supporting the DC—DC converter. The inductor 108, switching transistor 104, diode 106, and capacitor 110 are interoperably coupled to perform a buck DC—DC conversion. The power source 102, which may be an off-chip battery, provides a first potential with reference to a reference potential. In many IC applications, the power source 102 will have a potential of 5 volts, wherein the output potential 111, or the potential across the load 112, will be 2.7–3.3 volts. The sizes of the inductor 108 and the switching rate of the switching transistor 104 are determined based on the power requirements needed.

The control circuit 26 regulates the output of the DC—DC converter 100 in the same manner as was discussed in the description of FIG. 1. As was shown in FIG. 1, the output voltage 111 is sampled by a sensing circuit 34, and the control circuit 26 generates the regulated signal 52, which is a pulse-width modulated signal having a variable duty cycle. By varying the duty cycle of the regulated signal 52, the control circuit maintains a desired level at the output potential 111.

The current-limiting circuit 114 includes a reference current source 124, a reference transistor 126, a comparator 118, and a reset register 116. In operation, the comparator 118 receives, via a second input, a signal 122 which represents the voltage across the switching transistor 104 with respect to the power source 102. The signal 122 is compared with a reference signal 120 that is generated by the reference current source 124 and the reference transistor 126.

When the signal 122 compares unfavorably with the reference signal 120, the comparator 118 will produce a logic high signal. This logic high signal sets the output of the reset register 116. When the set input of the reset register 116 is logic high, the Q-bar output asserts the current limiting signal 50 (logic low), which gates the regulated signal 52 in a similar manner to that of FIG. 1. Thus, in a current-limiting situation, the signal provided to the switching transistor 104 is truncated via the current limiting signal 50. The reset register 116 is reset via the pulse-width modulated signal from the control circuit 26.

The reference transistor 126 includes a first node 125, which is coupled to the reference current source 124, and a second node 127, which is coupled to the power source 102. The second node 105 of the switching transistor 104 is also coupled to the power source 102. Note that the control node 129 of the reference transistor 126 is coupled to ground. By having the control node 129 coupled to ground, when the signal provided to the control node 107 is logic low, the potentials at nodes 107 and 129 will be substantially similar.

The reference transistor 126 is selected to be a scaled and matched version of the switching transistor 104. By scaling and matching the reference transistor 126 to the switching transistor 104, the reference transistor 126 will draw a proportional current and generate a similar voltage to that across the switching transistor 104, while consuming less power than prior art solutions.

FIG. 2 also illustrates a substrate 77 which encircles the current limiting circuit 114, the control circuit 26, the switching transistor 104, and the diode 106. As shown, these elements are deposited on an IC substrate to provide on-chip current-limiting capabilities for a DC—DC converter. Note that the diode 106 may be achieved using an off-chip diode or p-channel and n-channel regulated transistors.

Figure 3:
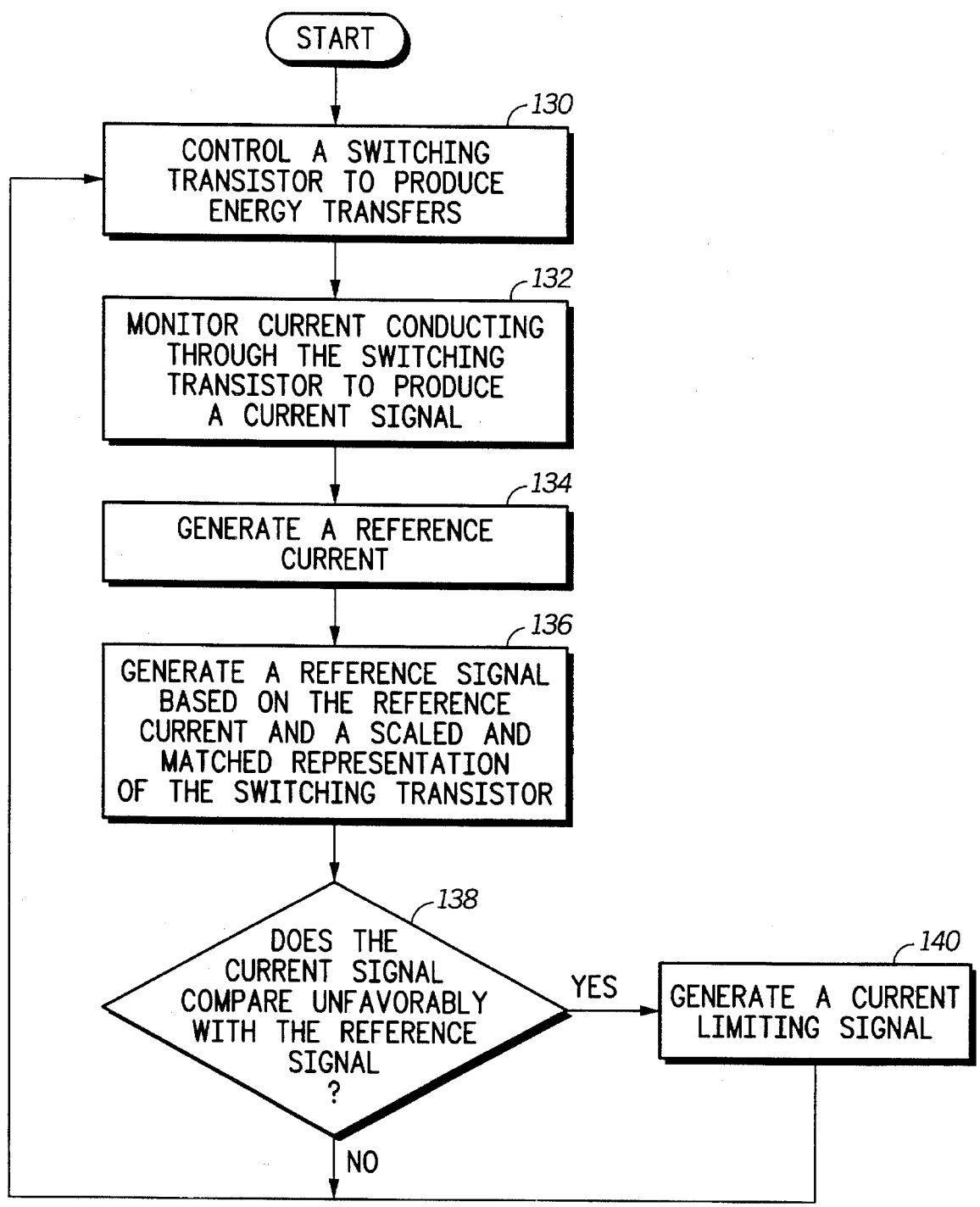
FIG. 3 illustrates, in a logic diagram, a method for current limiting on an on-chip power supply in accordance with the present invention.

FIG. 3 illustrates a method for current limiting an on-chip power supply. In step 130, a switching transistor is controlled to produce energy transfers. The energy transfers between an inductor and a capacitor, wherein the switching capacitor and diode regulate the transfer of energy between the two energy storage devices. At step 132, the current through the switching transistor is monitored to produce a current signal. The current signal is based on the on-resistance of the switching transistor and the current flowing through it.

At step 134, a reference current is generated via a current source. The reference current is used in conjunction with a scaled and matched representation of the switching transistor to produce a reference signal at step 136. Note that the reference current and the scaled and matched representation of the switching transistor are selected based on the maximum current desired in the DC—DC converter or through the switching transistor.

At step 138, the current signal is compared with the reference signal. If the comparison of step 138 is unfavorable, a current limiting signal is produced at step 140. The current limiting signal can then be used to affect the control of the switching transistor to regulate the current flowing through the switching transistor, and ensure that it does not exceed the maximum current desired.

It should be noted that, for those skilled in the art, the current limiting circuits illustrated for the boost and buck topology DC—DC converters of FIG. 1 and FIG. 2 are easily modified for use in other DC converters such those employing half-bridge inverter, full-bridge inverter, and flyback topologies. The skilled artisan will also readily appreciate that the DC—DC converter may be a portion of a switch mode power supply. The skilled artisan will also readily appreciate that the switching transistor and the matched reference transistor could be Metal Oxide Semiconductor Field Affect Transistors (MOSFETs) or bipolar transistors.

The present invention provides a method and apparatus for a DC—DC converter current-limiting circuit. Typical prior art techniques suffer from excessive power consumption by a resistor in series with the switching transistor or additional off-chip current-sensing transformers required to generate a current-based voltage. By utilizing the method and apparatus described herein, current limiting can be achieved with an on-chip implementation that avoids the additional power consumption, cost, and complexity of prior art solutions.

I claim:

1. An on-chip current limiting circuit comprising:

a reference transistor that is deposited on a substrate, wherein the reference transistor has a first reference node and a second reference node, wherein the reference transistor is scaled and electrically matched to a current controlling transistor deposited on the substrate, wherein the current controlling transistor has a first node and a second node, and wherein the second node and the second reference node are coupled to a reference potential;

a reference current source deposited on the substrate, wherein the reference current source is operably coupled to the reference transistor at the first reference node, and wherein the reference current source produces a reference current; and a comparator deposited on the substrate, wherein the comparator has a first input and a second input, wherein the first input is operably coupled to receive a reference signal from the first reference node and the second input is connected to receive a signal from the first node, and wherein, when the signal compares unfavorably to the reference signal, the comparator generates a current limiting signal such that current through the current controlling transistor is limited based on the reference current.

2. The on-chip current limiting circuit of claim 1, wherein the reference transistor includes a reference control node and the current controlling transistor includes a control node and wherein, when the current controlling transistor is conducting, the reference control node and the control node are coupled to substantially identical potentials.

3. The on-chip current limiting circuit of claim 2 further comprises a reset register operably coupled to the comparator and the control node, wherein, when the current limiting signal is generated, the reset register disables the current controlling transistor.

4. An on-chip DC—DC converter comprising:

a switching transistor deposited on a substrate, wherein the switching transistor has a control node, a first node, and a second node;

a controlling circuit deposited on the substrate, wherein the controlling circuit provides a regulated signal to the control node;

a current limiting circuit deposited on the substrate, wherein the current limiting circuit includes:

a reference transistor having a first reference node and a second reference node, wherein the reference transistor is scaled and electrically matched to the switching transistor, and wherein the second node and the second reference node are coupled to a reference potential;

a reference current source operably coupled to the reference transistor at the first reference node, and wherein the reference current source produces a reference current; and a comparator having a first input and a second input, wherein the first input is operably coupled to receive a reference signal from the first reference node and the second input is connected to receive a signal from the first node, and wherein, when the signal compares unfavorably to the reference signal, the comparator provides a current limiting signal to the controlling circuit, wherein current through the switching transistor is limited based on the reference current.

5. The on-chip DC—DC converter of claim 4 further comprises an inductor operably coupled to the first node, wherein when there is current through the switching transistor, the inductor stores energy.

6. The on-chip DC—DC converter of claim 5 further comprises a power source operably coupled to the inductor, wherein the power source supplies energy to the on-chip DC—DC converter at a first potential.

7. The on-chip DC—DC converter of claim 6 further comprises a capacitor, wherein the capacitor stores at least a portion of the energy to produce a second potential when the switching transistor is not conducting.

8. The on-chip DC—DC converter of claim 7 further comprises a diode deposited on the substrate, wherein the diode regulates the energy between the inductor and the capacitor.

9. The on-chip DC—DC converter of claim 4 further comprises an inductor, a power source, a capacitor, and a diode intercoupled with the switching transistor to produce a step-down DC—DC converter.

10. A method for current limiting an on chip power supply, the method comprising:
   a) controlling a switching transistor to produce energy transfers;
   b) monitoring current conducting through the switching transistor based on on-resistance of the switching transistor to produce a current signal;
   c) generating a reference current;
   d) generating a reference signal based on the reference current and a scaled and matched representation of the switching transistor;
   e) comparing the current signal and the reference signal; and
   f) when the current signal compares unfavorably with the reference signal, generating a current limiting signal.

11. The method of claim 10, wherein step (f) further comprises determining an unfavorable comparison when the current conducting through the switching transistor exceeds a predetermined value.

12. The method of claim 10, where step (a) further comprises controlling a switching transistor to produce energy transfers between an inductor and a capacitor.

* * * * *